(12) United States Patent
Rofougaran (10) Patent No.: US 8,855,093 B2
(45) Date of Patent: *Oct. 7, 2014

(54) METHOD AND SYSTEM FOR CHIP-TO-CHIP COMMUNICATIONS WITH WIRELINE CONTROL

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 779 days.

This patent is subject to a terminal disclaimer.

(21) Appl. No.: 11/954,361

(22) Filed: Dec. 12, 2007

(65) Prior Publication Data

US 2009/0157927 A1    Jun. 18, 2009

(51) Int. Cl.
| H04B 7/216 | (2006.01) |
| H04W 4/00 | (2009.01) |
| G06F 15/163 | (2006.01) |
| H04W 40/00 | (2009.01) |

(52) U.S. Cl.
CPC ............. G06F 15/163 (2013.01); *H04W 40/00* (2013.01)
USPC .......................................... 370/342; 370/338

(58) Field of Classification Search
USPC ......................................................... 370/342
See application file for complete search history.

(56) References Cited

U.S. PATENT DOCUMENTS

| 5,003,622 | A | 3/1991 | Ma et al. |
| 5,015,972 | A | 5/1991 | Cygan et al. |
| 5,621,913 | A | * | 4/1997 | Tuttle et al. ................... 455/41.2 |
| 5,798,567 | A | 8/1998 | Kelly et al. |
| 5,861,853 | A | 1/1999 | Haub et al. |
| 5,914,873 | A | 6/1999 | Blish |
| 6,060,433 | A | 5/2000 | Li et al. |
| 6,573,808 | B1 | 6/2003 | Burin |
| 6,646,581 | B1 | 11/2003 | Huang |

(Continued)

FOREIGN PATENT DOCUMENTS

| CN | 1716695 | 1/2006 |
| EP | 1146592 | 10/2001 |

(Continued)

OTHER PUBLICATIONS

European Search Report corresponding to European Patent Application Serial No. 08020768.1-2411, dated Mar. 10, 2009.

(Continued)

*Primary Examiner* — Guang Li
(74) *Attorney, Agent, or Firm* — Oblon, Spivak, McClelland, Maier & Neustadt, L.L.P.

(57) ABSTRACT

Aspects of a method and system for chip-to-chip communications with wireline control may include initializing a microwave communication link between a first chip and a second chip via a wireline communication bus, wherein the initializing comprises adjusting beamforming parameters of a first antenna array communicatively coupled to the first chip, and of a second antenna array communicatively coupled to the second chip. The first chip and the second chip may communicate data via said microwave communication link. The microwave communication link may be routed via one or more relay chips, when the first chip and the second chip cannot directly communicate satisfactorily. Control data may be transferred between the first chip, the second chip, and/or the one or more relay chips, which may comprise one or more antennas. The relay chips may be dedicated relay ICs or multi-purpose transmitter/receivers.

24 Claims, 5 Drawing Sheets

(56) References Cited

U.S. PATENT DOCUMENTS

| | | | |
|---|---|---|---|
| 6,809,581 B2 | 10/2004 | Rofougaran et al. | |
| 6,838,763 B2 * | 1/2005 | Ahn et al. | 257/698 |
| 6,853,257 B2 | 2/2005 | Yonekawa | |
| 7,038,625 B1 | 5/2006 | Taylor | |
| 7,068,621 B2 * | 6/2006 | Bouet et al. | 370/328 |
| 7,081,800 B2 | 7/2006 | He et al. | |
| 7,138,884 B2 | 11/2006 | Cheung et al. | |
| 7,247,932 B1 | 7/2007 | Lin et al. | |
| 7,260,424 B2 | 8/2007 | Schmidt | |
| 7,469,152 B2 | 12/2008 | Cetiner et al. | |
| 7,535,958 B2 * | 5/2009 | Best | 375/239 |
| 7,783,256 B2 * | 8/2010 | Bocking et al. | 455/41.2 |
| 8,626,104 B2 * | 1/2014 | Huang et al. | 455/310 |
| 2002/0039026 A1 | 4/2002 | Stroth et al. | |
| 2002/0163895 A1 * | 11/2002 | Haller et al. | 370/335 |
| 2004/0041732 A1 | 3/2004 | Aikawa et al. | |
| 2004/0042428 A1 * | 3/2004 | Hamalainen et al. | 370/335 |
| 2004/0150483 A1 | 8/2004 | Cho | |
| 2004/0150554 A1 | 8/2004 | Stenger et al. | |
| 2004/0201526 A1 | 10/2004 | Knowles et al. | |
| 2004/0207504 A1 | 10/2004 | Yang et al. | |
| 2004/0222506 A1 | 11/2004 | Wei et al. | |
| 2005/0012675 A1 | 1/2005 | Sakiyama et al. | |
| 2005/0075080 A1 * | 4/2005 | Zhang | 455/73 |
| 2005/0094571 A1 * | 5/2005 | Lempio et al. | 370/252 |
| 2005/0104665 A1 | 5/2005 | Molnar et al. | |
| 2005/0212642 A1 | 9/2005 | Pleskach et al. | |
| 2005/0250444 A1 * | 11/2005 | Zinn et al. | 455/41.2 |
| 2005/0270135 A1 | 12/2005 | Chua et al. | |
| 2005/0276322 A1 * | 12/2005 | Best | 375/239 |
| 2006/0033671 A1 | 2/2006 | Chan et al. | |
| 2006/0091958 A1 | 5/2006 | Bhatti et al. | |
| 2006/0092079 A1 | 5/2006 | deRochemont | |
| 2006/0152911 A1 | 7/2006 | Humbert et al. | |
| 2006/0189294 A1 * | 8/2006 | Goodnow et al. | 455/333 |
| 2006/0211449 A1 * | 9/2006 | Haque et al. | 455/556.1 |
| 2007/0013051 A1 | 1/2007 | Heyan et al. | |
| 2007/0139112 A1 | 6/2007 | Bocock et al. | |
| 2007/0194911 A1 | 8/2007 | Page | |
| 2007/0205748 A1 | 9/2007 | Abou | |
| 2007/0207734 A1 * | 9/2007 | Briere | 455/41.2 |
| 2007/0234170 A1 * | 10/2007 | Shao et al. | 714/746 |
| 2008/0048760 A1 | 2/2008 | El Rai et al. | |
| 2008/0134271 A1 * | 6/2008 | Qin et al. | 725/118 |
| 2008/0177886 A1 * | 7/2008 | Singh et al. | 709/228 |
| 2008/0284609 A1 * | 11/2008 | Rofougaran | 340/584 |
| 2008/0291115 A1 | 11/2008 | Doan et al. | |
| 2009/0153260 A1 | 6/2009 | Rofougaran | |
| 2009/0153421 A1 | 6/2009 | Rofougaran et al. | |
| 2009/0153427 A1 | 6/2009 | Rofougaran | |
| 2009/0156157 A1 | 6/2009 | Rofougaran et al. | |
| 2009/0179814 A1 | 7/2009 | Park et al. | |
| 2009/0189064 A1 | 7/2009 | Miller et al. | |
| 2009/0243741 A1 | 10/2009 | Rofougaran | |
| 2009/0243749 A1 | 10/2009 | Rofougaran | |
| 2009/0243767 A1 | 10/2009 | Rofougaran | |
| 2010/0090902 A1 | 4/2010 | Thompson et al. | |

FOREIGN PATENT DOCUMENTS

| | | |
|---|---|---|
| JP | 403019358 | 1/1991 |
| KR | 20040064210 | 7/2004 |
| KR | 20050065395 | 6/2005 |
| KR | 20060087503 | 8/2006 |
| WO | WO9621255 A1 | 7/1996 |
| WO | WO 02/080367 | 10/2002 |
| WO | WO2007114620 | 10/2007 |

OTHER PUBLICATIONS

Celebi et al., "Ultrawideband Design Challenges for Wireless Chip-to-Chip Communications and Interconnects." IEEE Big Sky Aerospace Conference, Mar. 4-11, 2006.

Perndl, "Monolithic Microwave Integrated Circuits in SiGe:C Bipolar Technology" Dissertation, Nov. 2004.

* cited by examiner

METHOD AND SYSTEM FOR CHIP-TO-CHIP COMMUNICATIONS WITH WIRELINE CONTROL

CROSS-REFERENCE TO RELATED APPLICATIONS/INCORPORATION BY REFERENCE

Not applicable.

FIELD OF THE INVENTION

Certain embodiments of the invention relate to communication systems. More specifically, certain embodiments of the invention relate to a method and system for chip-to-chip communications with wireline control.

BACKGROUND OF THE INVENTION

Electronic communication has become prolific over the last decade. While electronic communication was initially limited to the desktop, recent trends have been to make communications, media content and the Internet available anytime, anywhere and, increasingly, on any device. Already now, it is quite common to find mobile devices such as cellular phones or Personal Digital Assistants (PDAs) that incorporate a large range of communication technologies and associated software. For example, fully-featured web-browsers, email clients, MP3 players, instant messenger software, and Voice-over-IP may all be found on some recent devices.

Currently, there are many different communication technologies and protocols, some of which may utilize common data formats and while others may utilize different data formats. Today's mobile communication devices have to support these many different communication technologies, protocols and/or data formats.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for chip-to-chip communications with wireline control, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for portable data storage with an integrated 60 GHz radio. Aspects of a method and system for portable data storage with integrated 60 GHz radio may comprise initializing a microwave communication link between a first chip and a second chip via a wireline communication bus, wherein the initializing comprises adjusting beamforming parameters of a first antenna array communicatively coupled to the first chip, and a second antenna array communicatively coupled to the second chip. The first chip and the second chip may communicate data via said microwave communication link. The microwave communication link may be routed via one or more relay chips, when the first chip and the second chip cannot directly communicate satisfactorily. Control data may be transferred between the first chip, the second chip, and/or the one or more relay chips, which may comprise one or more antennas. The relay chips may be dedicated relay ICs or multi-purpose transmitter/receivers. The first chip and the second chip may receive and transmit in the 60 GHz frequency band. The first antenna array and/or the second antenna array may be on an integrated circuit package, or on an integrated circuit of the first chip and/or the second chip, respectively. The first antenna array and the second antenna array may comprise one or more antennas. The beamforming parameters may be adjusted to optimize a communication link performance metric.

Figure 1:
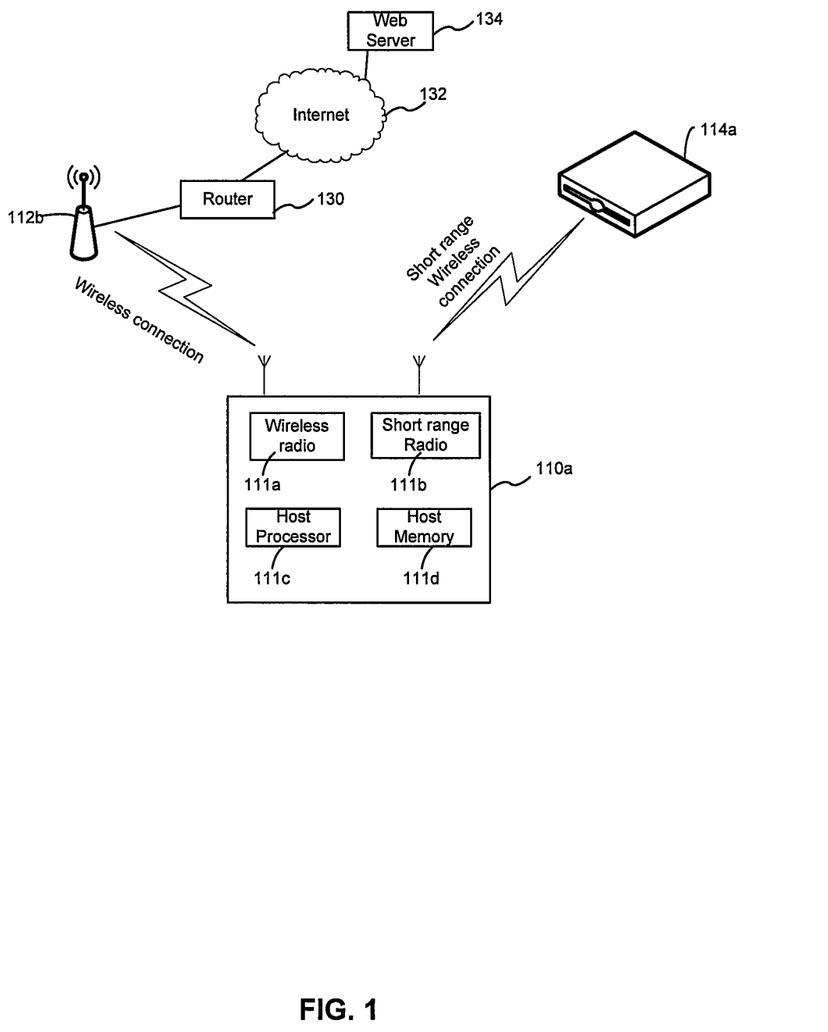
FIG. 1 is a diagram illustrating an exemplary wireless communication system, in accordance with an embodiment of the invention.

FIG. 1 is a diagram illustrating an exemplary wireless communication system, in accordance with an embodiment of the invention. Referring to FIG. 1, there is shown an access point 112b, a computer 110a, a portable storage 114a, a router 130, the Internet 132 and a web server 134. The computer or host device 110a may comprise a wireless radio 111a, a short-range radio 111b, a host processor 111c, and a host memory 111d. There is also shown a wireless connection between the wireless radio 111a and the access point 112b, and a short-range wireless connection between the short-range radio 111b and the portable storage 114a.

The access point 112b may comprise suitable logic, circuitry and/or code that may be enabled to transmit and receive radio frequency signals for data communications, for example with the wireless radio 111a. The access point 112b may also be enabled to communicate via a wired network, for example, with the router 130. The wireless radio 111a may comprise suitable logic, circuitry and/or code that may enable communications over radio frequency waves with one or more other radio communication devices. The wireless radio 111a and the access point 112b may be compliant with one or more mobile communication standard, for example, GSM, UMTS, or CDMA2000. The short range radio 111b may comprise suitable logic, circuitry and/or code that may enable communications over radio frequencies with one or more other communication devices, for example the portable storage 114a. The short range radio 111b and/or the portable storage 114a may be compliant with a wireless industry standard, for example Bluetooth, or IEEE 802.11 Wireless LAN. The host processor 111c may comprise suitable logic, circuitry and/or code that may be enabled to generate and process data. The host memory 111d may comprise suitable logic, circuitry and/or code that may be enabled to store and retrieve data for various system components and functions of the computer 110a. The router 130 may comprise suitable logic, circuitry and/or code that may be enabled to communicate with communication devices that may be communicatively coupled to it, for example access point 112b or the Internet 132. The Internet 132 may comprise suitable logic, circuitry and/or code that may be enabled to interconnect and exchange data between a plurality of communication devices. The web server 134 may comprise suitable logic, circuitry and/or code that may be enabled to communicate with communication devices that may be communicatively coupled to it, for example the Internet 132.

Frequently, computing and communication devices may comprise hardware and software that may enable communication using multiple wireless communication standards and/or protocols. There may be instances when the wireless radio 111a and the short-range radio 111b may be active concurrently. For example, it may be desirable for a user of the computer or host device 110a to access the Internet 132 in order to consume streaming content from the Web server 134. Accordingly, the user may establish a wireless connection between the computer 110a and the access point 112b. Once this connection is established, the streaming content from the Web server 134 may be received via the router 130, the access point 112b, and the wireless connection, and consumed by the computer or host device 110a.

It may be desirable for the user of the computer 110a to access data from the portable storage 114a. Accordingly, the user of the computer 110a may establish a short-range wireless connection with the portable storage 114a. In some instances, a wireless connection between the portable storage 114a and the computer 110a may be using a Bluetooth, IEEE 802.11 Wireless LAN, Ultrawideband, or 60 GHz communications protocol. When the short-range wireless connection is established, and with suitable configurations on the computer 110a enabled, data may be transferred from/to the portable storage 114a. In some instances, the data link between the portable storage 114a and the computer 110a may be enabled for high data rates. To achieve high data rates in very compact devices, for example the portable storage 114a, it may be desirable to use wireless communication links to connect the components of a device. For example, the chips comprised in the portable storage 114a may communicate data at high rate, for example in the Gbps range, via wireless links, for example via a 60 GHz microwave link.

Figure 2A:
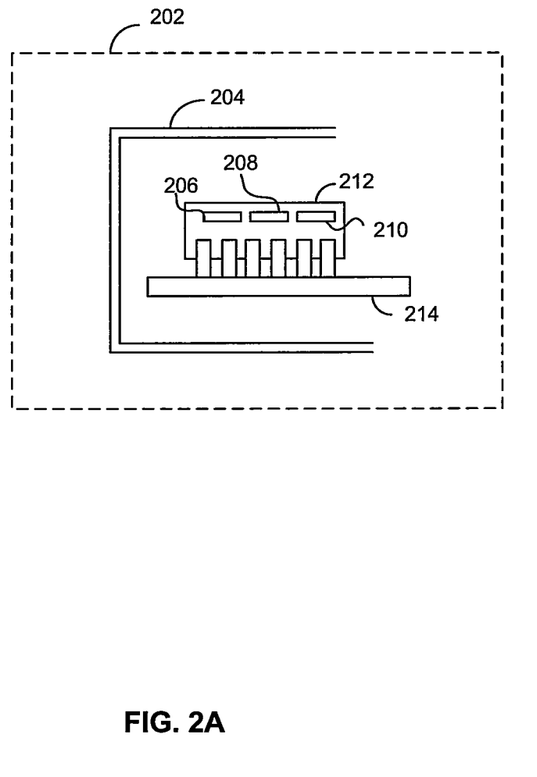
FIG. 2A is an illustration of a chip-based antenna array, in accordance with an embodiment of the invention.

FIG. 2A is an illustration of a chip-based antenna array, in accordance with an embodiment of the invention. Referring to FIG. 2A, there is shown a device 202. The device 202 may comprise a casing 204, one or more printed circuit boards (PCBs) 214, and one or more integrated circuits (ICs, chip), of which IC 212 may be illustrated. The IC 212 may comprise one or more antennas, of which antennas 206, 208 and 210 may be illustrated. In some instances, the device 202 may be, for example, a portable storage device.

The IC 212 may comprise suitable logic, circuitry and/or code that may be enabled to generate and/or process radio frequency signals for reception and/or transmission via the one or more antennas, of which antennas 206, 208 and 210 may be illustrated. The antennas 206, 208, and 210 may be used together to form an antenna array. The antennas 206, 208 and 210 may be implemented on the package of the IC 212 and/or directly on the IC 212. In these instances, the chip package may be constructed from radio-wave permeable materials, for example.

In accordance with various embodiments of the invention, a plurality of chips similar to chip 212 illustrated in FIG. 2A may communicate together at high data rates via, for example, 60 GHz wireless links via antenna arrays that may be implemented on and/or in the chip as described above.

In accordance with an embodiment of the invention, one or more communication links may be established between, for example, IC 212 and other chips associated to the device 202. In addition, the antenna array comprising antennas 206, 208, and 210, for example, on the device 202, and the antenna array on a communicating IC may be enabled to automatically steer the transmission and/or reception beam in a direction that may optimize the signal quality and hence the data rates that may be achievable.

Figure 2B:
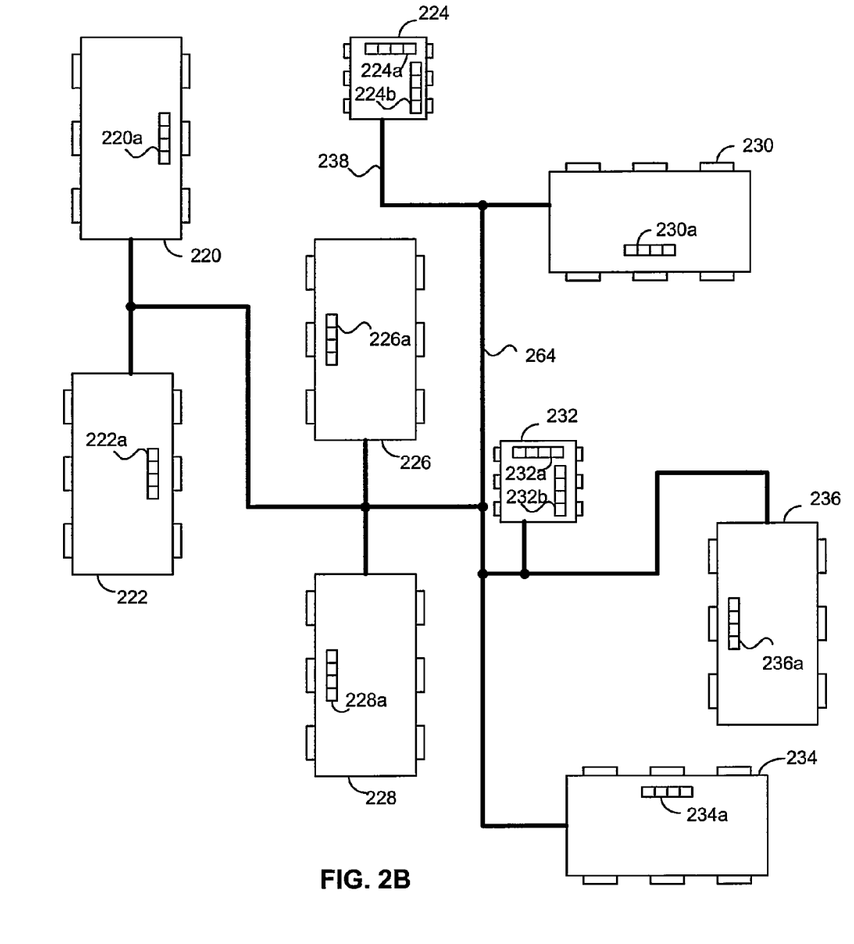
FIG. 2B is a diagram of a 60 GHz inter-chip communication system, in accordance with an embodiment of the invention.

FIG. 2B is a diagram of a 60 GHz inter-chip communication system, in accordance with an embodiment of the invention. Referring to FIG. 2B, there is shown a wireline communication bus 238, ICs 220, 222, 226, 228, 230, 234, and 236. The ICs 220, 222, 226, 228, 230, 234, and 236 may be substantially similar. For example, each of the ICs 220, 222, 226, 228, 230, 234, and 236 may comprise an antenna array 220a, 222a, 226a, 228a, 230a, 234a, and 236a, respectively. The IC 220, for example, may comprise suitable logic, circuitry and/or code that may be enabled to communicate on radio-frequency frequencies via the antenna array 220a, and via the wireline communication bus 238. There is also shown relay ICs 224 and 232. The relay ICs 224 and 232 may be substantially similar. The ICs 224 and 232 may comprise one or more antenna arrays. For example, IC 224 may comprise an antenna array 224a and an antenna array 224b. Similarly, the relay IC 232 may comprise antenna arrays 232a and 232b, for example. The relay IC 232, for example, may comprise suitable logic, circuitry and/or code that may be enabled to communicate on radio-frequency frequencies via the antenna arrays 224a and 224b, and via wireline communication via the wireline communication bus 238. The ICs 220, 222, 226, 228, 230, 234, and 236 and the relay ICs 224 and 232 may be communicatively coupled to the wireline bus 238.

The wireline bus 238 may be used as a low rate communication bus and as a control signal transport media that may help establish a high-rate 60 GHz radio communication link between a plurality of ICs. For example, it may be desirable for the IC 220 to communicate with the IC 226. Via the wireline bus 238, the IC 220 and/or the IC 226 may initiate a communication session and parameters for a wireless radio connection may be exchanged. When the setup phase may be completed, the antenna array 220a on IC 220 may be directed toward the antenna array 226a on IC 226, and data may be exchanged wirelessly at a high-data rate. In some instances, one or more ICs may not be able to directly communicate with another IC. For example, the IC 220 may desire to communicate with the IC 236.

As illustrated in FIG. 2B, in some instances, the IC 236 may not be in line of sight of the IC 220a because the IC 226 and the relay IC 232, may be obstructing a direct wireless link from IC 220 to IC 236. In these instances, the communication may be routed via relay ICs. The relay ICs, for example the ICs 224 and 232 may be enabled to receive communication data from one chip and forward it to another chip. For example, the IC 220 may transmit to the IC 236 via the relay IC 224. In another embodiment of the invention, the IC 220 may communicate with the IC 236 via the relay IC 224 and the IC 232. Similarly, the IC 222 may communicate with the IC 234 via the relay IC 232, for example. In accordance with various embodiments of the invention, the wireline bus 238 may be utilized to exchange control information and/or wireless link setup information. High-rate transfer may be achieved via the antennas, for example antenna array 220a, which are chip-based.

Figure 2C:
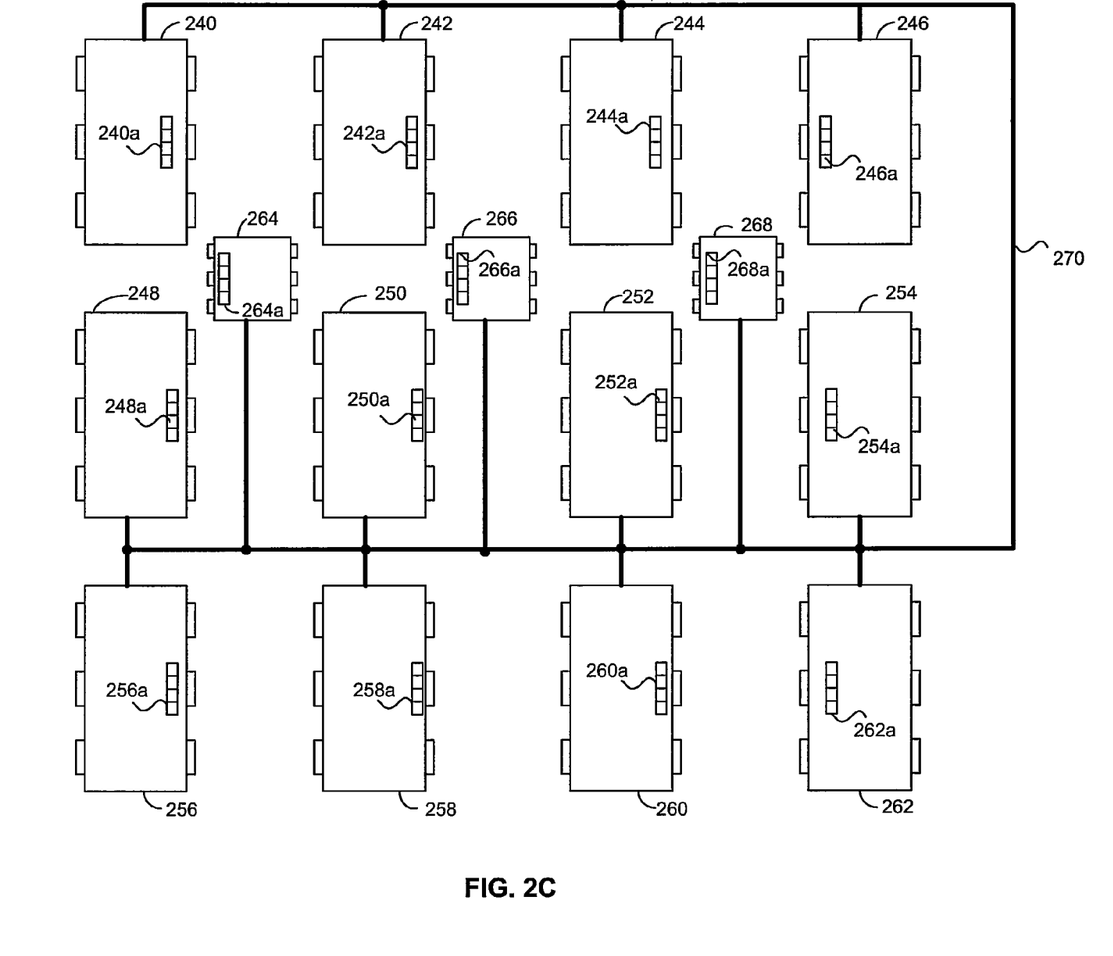
FIG. 2C is a diagram of a 60 GHz inter-chip communication system, in accordance with an embodiment of the invention.

FIG. 2C is a diagram of a 60 GHz inter-chip communication system, in accordance with an embodiment of the invention. Referring to FIG. 2C, there is shown a wireline communication bus 270, ICs 240, 242, 244, 246, 248, 250, 252, 254, 256, 258, 260 and 262. The ICs 240, 242, 244, 246, 248, 250, 252, 254, 256, 258, 260 and 262 may be substantially similar. For example, each of the ICs 240, 242, 244, 246, 248, 250, 252, 254, 256, 258, 260 and 262 may comprise an antenna array 240a, 242a, 244a, 246a, 248a, 250a, 252a, 254a, 256a, 258a, 260a and 262a, respectively.

The IC 240, for example, may comprise suitable logic, circuitry and/or code that may be enabled to communicate on radio-frequency frequencies via the antenna array 240a, and via the wireline communication bus 270. There is also shown relay ICs 264, 266, and 268. The relay ICs 264, 266, and 268 may be substantially similar to IC 240. The relay ICs 264, 266, and 268 may comprise one or more antenna arrays. For example, relay IC 264 may comprise an antenna array 264a. The relay IC 264, for example, may comprise suitable logic, circuitry and/or code that may be enabled to communicate on radio-frequency frequencies via the antenna arrays 264a, and via wireline communication via the wireline communication bus 270. The ICs 240, 242, 244, 246, 248, 250, 252, 254, 256, 258, 260 and 262 and the relay ICs 264, 266, and 268 may be communicatively coupled to the wireline communication bus 270.

Similar to FIG. 2B, the wireline communication bus 270 may be used to exchange control information and setup a 60 GHz wireless connection between a plurality of ICs. In some instances, a regular grid of ICs as illustrated in FIG. 2C may be utilized. As illustrated, because of the wireless links, various embodiments of the invention may comprise a high density of chips since fewer physical connections may be required, for example, on the printed circuit board. For example, the IC 256 may desire to communicate with the IC 244. The communication parameters may be exchanged via the wireline communication bus 270, and a wireless communication may be initialized. In this instance, the IC 256 may steer its antenna array 256a toward the relay IC 264. The relay IC 264 may relay messages from, and to the IC 256 via the relay IC 266 and/or the relay IC 268. In accordance with various embodiments of the invention, the relay ICs may be dedicated relay chips and/or multi-purpose transmitter/receiver chips that may be enabled to initiate communication sessions on their own.

Figure 3:
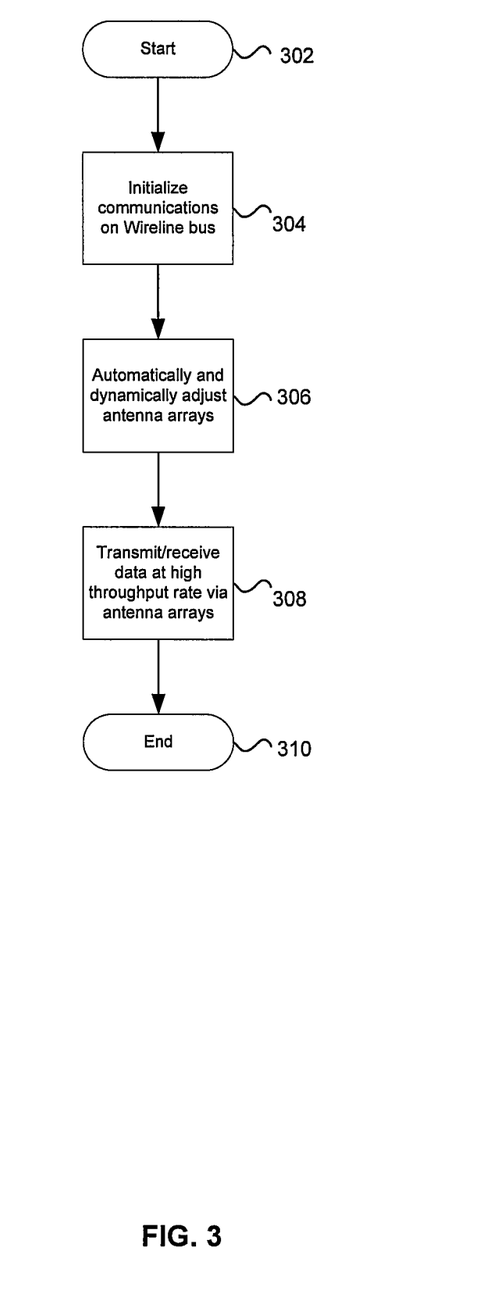
FIG. 3 is a flow chart illustrating an exemplary communication setup, in accordance with an embodiment of the invention.

FIG. 3 is a flow chart illustrating an exemplary communication setup, in accordance with an embodiment of the invention. The communication setup process may be initialized in step 302. In step 304, the initial communications setup may be established, for example between the IC 250 and the IC 254, as illustrated in FIG. 2C. In accordance with various embodiments of the invention, the initialization of the communication may be achieved via a wireline bus, for example the wireline communication bus 238 and 270, as described for FIG. 2B and FIG. 2C. In step 306, after the connection has been set up, the 60 GHz antenna arrays on the IC, for example IC 250, may automatically and/or dynamically adjust their beam patterns in order to optimize some communication performance parameters. For example, the beams may be adjusted in order to optimize signal strength, Signal-to-Interference-and-Noise-Ratio (SINR), packet error rate (PER) or bit error rate (BER). The beam patterns and parameters may be adjusted, for example through transmitted and received training data. In step 308, the transmission and reception of the data through the antenna arrays may take place. In some instances, a plurality of communicating ICs may be required to transmit and/or receive data via relay ICs, for example relay ICs 264, 266, and 268.

In accordance with an embodiment of the invention, a method and system for chip-to-chip communications with wireline control may comprise initializing a microwave communication link between a first chip, for example chip 222, and a second chip, for example chip 234, via a wireline communication bus 238, wherein the initializing comprises adjusting beamforming parameters of a first antenna array, for example 222a, communicatively coupled to the first chip 222, and a second antenna array, for example 234a, communicatively coupled to the second chip 234. The first chip, for example chip 222, and the second chip, for example chip 234, may communicate data via said microwave communication link, as described in FIG. 2B and FIG. 2C. The microwave communication link may be routed via one or more relay chips, for example relay chip 232, when the first chip, for example chip 222, and the second chip, for example chip 234, cannot directly communicate satisfactorily. Control data may be transferred between the first chip 222, the second chip 234, and/or the one or more relay chips, for example relay chip 232, which may comprise one or more antennas, for example antennas 232a and 232b. The relay chips may be dedicated relay ICs or multi-purpose transmitter/receivers. The first chip and the second chip may receive and transmit in the 60 GHz frequency band. The first antenna array and/or the second antenna array may be on an integrated circuit package, or on an integrated circuit of the first chip and/or the second chip, respectively, as illustrated in FIG. 2A, for example. The first antenna array and the second antenna array may comprise one or more antennas. The beamforming parameters may be adjusted to optimize a communication link performance metric.

Another embodiment of the invention may provide a machine-readable storage, having stored thereon, a computer program having at least one code section executable by a machine, thereby causing the machine to perform the steps as described herein for a method and system for chip-to-chip communications with wireline control.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A communication method for wirelessly transmitting data in an inter-chip communication system including a first chip, a second chip and a relay chip, the method comprising:
   exchanging control information by the first chip with the second chip by communicating, via a wired connection link, beamforming parameters of a first antenna array and beamforming parameters of a second antenna array, the first chip directly coupled to the second chip by the wired connection link, the first chip including the first antenna array and the second chip including the second antenna array;
   adjusting, by the first chip, communication parameters of the first antenna array, in accordance with the exchanged control information for communication with the second antenna array, by adjusting the beamforming parameters of the first antenna array for the wireless communication with the second antenna array;
   determining, by the first chip, whether the first antenna array and the second antenna array are in line of sight of one another;
   when the first chip determines that the first antenna array and the second antenna array are in line of sight of one another, wirelessly transmitting the data, by the first antenna array directly to the second antenna array; and
   when the first chip determines that the first antenna array and the second antenna array are not in line of sight of one another, wirelessly transmitting the data, by the first antenna array to a third antenna array of the relay chip, the relay chip relaying the data to the second chip by transmitting the data by the third antenna array to the second antenna array.

2. The method of according to claim 1, wherein
   the first chip is directly coupled to the relay chip via the wired connection link,
   the second chip is directly coupled to the relay chip via the wired connection link, and
   the exchanging of the control information by the first chip with the second chip includes exchanging the control information, by the first chip with the second chip via the relay chip over the wired connection link.

3. The method according to claim 1, wherein said first chip said second chip receive and transmit in the 60 GHz frequency band.

4. The method according to claim 1, wherein said first antenna array is on an integrated circuit package, or on an integrated circuit of said first chip.

5. The method according to claim 1, wherein said second antenna array is on an integrated circuit package, or on an integrated circuit of said second chip.

6. The method according to claim 1, wherein said first antenna array and said second antenna array comprise one or more antennas.

7. The method according to claim 1, further comprising:
   receiving, by the first antenna array of the first chip, respond data from the second antenna array of the second chip or the third antenna array of the relay chip, the response data received in response to the data transmitted by the first antenna array.

8. The method according to claim 1, wherein
   the first chip is directly coupled to the relay chip via the wired connection link, and
   when the first chip determines that the first antenna array and the second antenna array are not in line of sight of one another, the method further comprises:
   exchanging control information by the first chip with the relay chip via the wired connection link.

9. The method according to claim 8, wherein when the first chip determines that the first antenna array and the second antenna array are not in line of sight of one another, the method further comprises:
   adjusting, by the first chip, communication parameters of the first antenna array, in accordance with the control information exchanged with the relay chip, for communication between the first antenna array and the third antenna array.

10. An inter-chip communication system comprising:
    a first chip including a first antenna array;
    a second chip including a second antenna array;
    a relay chip including a third antenna array; and
    a wired connection link that directly couples the first chip to the second chip, wherein the first chip is configured to:
       exchange control information with the second chip by communicating, via the wired connection link, beamforming parameters of the first antenna array and beamforming parameters of the second antenna array;
       adjust communication parameters of the first antenna array, in accordance with the exchanged control information for communication with the second antenna array, by adjusting the beamforming parameters of the first antenna array for the wireless communication with the second antenna array;
       determine whether the first antenna array and the second antenna array are in line of sight of one another;
       wirelessly transmit data by the first antenna array directly to the second antenna array when the first chip determines that the first antenna array and the second antenna array are in line of sight of one another; and
       wirelessly transmit the data by the first antenna array to the third antenna array when the first chip determines that the first antenna array and the second antenna array are not in line of sight of one another; and
    the relay chip is configured to, when the first antenna array and the second antenna array are not in line of sight of one another:
       receive, by the third antenna array, the data transmitted from the first antenna array; and
       transmit, by the third antenna array, the data to the second antenna array.

11. The system according to claim 10, wherein
    the first chip is directly coupled to the relay chip via the wired connection link,
    the second chip is directly coupled to the relay chip via the wired connection link, and
    the first chip is further configured to exchange of the control information with the second chip by exchanging the control information with the second chip via the relay chip over the wired connection link.

12. The system according to claim 10, wherein said first chip and said second chip receive and transmit in the 60 GHz frequency band.

13. The system according to claim 10, wherein said first antenna array is on an integrated circuit package, or on an integrated circuit of said first chip.

14. The system according to claim 10, wherein said second antenna array is on an integrated circuit package, or on an integrated circuit of said second chip.

15. The system according to claim 10, wherein said first antenna array and said second antenna array comprise one or more antennas.

16. The system according to claim 10, wherein the first chip is further configured to
Receive, by the first antenna array of the first chip, response data from the second antenna array of the second chip or the third antenna array of the relay chip, the response data received in response to the data transmitted by the first antenna array.

17. The system according to claim 10, wherein
the first chip is directly coupled to the relay chip via the wired connection link, and
when the first chip determines that the first antenna array and the second antenna array are not in line of sight of one another, the first chip is further configured to exchange control information by the first chip with the relay chip via the wired connection link.

18. The system according to claim 10, wherein when the first chip determines that the first antenna array and the second antenna array are not in line of sight of one another, the first chip is further configured to adjust communication parameters of the first antenna array, in accordance with the control information exchanged with the relay chip, for communication between the first antenna array and the third antenna array.

19. A non-transitory computer readable medium storing computer readable instructions that, when executed by an inter-chip communication system including a first chip, a second chip and a relay chip, cause the inter-chip communication system to:
exchange control information by the first chip with the second chip by communicating, via a wired connection link, beamforming parameters of a first antenna array and beamforming parameters of a second antenna array, the first chip directly coupled to the second chip by the wired connection link, the first chip including the first antenna array and the second chip including the second antenna array;
adjust, by the first chip, communication parameters of the first antenna array, in accordance with the exchanged control information for communication with the second antenna array, by adjusting the beamforming parameters of the first antenna array for the wireless communication with the second antenna array;
determine, by the first chip, whether the first antenna array and the second antenna array are in line of sight of one another;
when the first chip determines that the first antenna array and the second antenna array are in line of sight of one another, wirelessly transmit data, by the first antenna array directly to the second antenna array; and
when the first chip determines that the first antenna array and the second antenna array are not in line of sight of one another, wirelessly transmit the data, by the first antenna array to a third antenna array of the relay chip, the relay chip relaying the data to the second chip by transmitting the data by the third antenna array to the second antenna array.

20. The non-transitory computer readable medium according to claim 19, wherein the inter-chip communication system is further caused to:
receive, by the first antenna array of the first chip, response data from the second antenna array of the second chip or the third antenna array of the relay chip, the response data received in response to the data transmitted by the first antenna array.

21. The non-transitory computer readable medium according to claim 19, wherein
the first chip is directly coupled to the relay chip via the wired connection link, and
when the first chip determines that the first antenna array and the second antenna array are not in line of sight of one another, the inter-chip communication system is further caused to:
exchange control information by the first chip with the relay chip via the wired connection link.

22. The non-transitory computer readable medium according to claim 19, wherein said first antenna array is on an integrated circuit package, or on an integrated circuit of said first chip.

23. The non-transitory computer readable medium according to claim 19, wherein said second antenna array is on an integrated circuit package, or on an integrated circuit of said second chip.

24. The non-transitory computer readable medium according to claim 19, wherein said first antenna array and said second antenna array comprise one or more antennas.

* * * * *